United States Patent [19]
Ridyard et al.

[11] Patent Number: 5,812,262
[45] Date of Patent: Sep. 22, 1998

[54] WAVEGUIDE FOR RADIATION DETECTION SYSTEM

[75] Inventors: Andrew Ridyard, St Agnes, England; David Shrewsbury, Argyll, Scotland

[73] Assignee: 4D Controls Limited, Cornwall, Great Britain

[21] Appl. No.: 776,792
[22] PCT Filed: Aug. 11, 1995
[86] PCT No.: PCT/GB95/01902
  § 371 Date: Apr. 10, 1997
  § 102(e) Date: Apr. 10, 1997
[87] PCT Pub. No.: WO96/05487
  PCT Pub. Date: Feb. 22, 1996

[30] Foreign Application Priority Data

Aug. 11, 1994 [GB] United Kingdom .................. 9416223

[51] Int. Cl.⁶ .................. G01J 3/18; G01N 21/33
[52] U.S. Cl. .................. 356/328; 356/334; 250/372
[58] Field of Search .................. 356/328, 334; 250/372

[56] References Cited

U.S. PATENT DOCUMENTS

| | | | |
|---|---|---|---|
| 4,375,919 | 3/1983 | Busch | 356/328 X |
| 4,935,631 | 6/1990 | Mosley et al. | 250/372 X |
| 5,026,160 | 6/1991 | Dorain et al. | 356/328 |

FOREIGN PATENT DOCUMENTS

| | | | |
|---|---|---|---|
| 2680012 | 2/1993 | France. | |
| 4223741 | 1/1994 | Germany | 250/372 |
| 55-6320 | 1/1980 | Japan | 356/328 |
| 1076393 | 7/1967 | United Kingdom | 356/328 |

OTHER PUBLICATIONS

Fujii et al, "Optical Demultiplexer Utilizing an Ebert Mounting Silicon Grating" Journal of Lightwave Technology, vol. LT–2, No. 5 Oct. 1984, pp. 731–734.

Beranek et al. "Physical Design & Fabrication .... Multimode Fiber–Optic WDM Systems" IEEE Transactions on Components, Hybrids & Manufacturing Technology Aug. 1993, pp. 511–516.

Patent Abstracts of Japan, vol. 005, No. 173, (P–087) 12 Aug. 1981, 56100323 (Ritsuo).

*Primary Examiner*—Vincent P. McGraw
*Attorney, Agent, or Firm*—Breiner & Breiner

[57] ABSTRACT

An ultra violet radiation detector comprises a slice of silica (10) having an entrance slit (18) from which radiation diverges to a curved reflective face (20, 22) which reflects it to a planar diffraction grating (28) as a convergent beam. The grating focuses a required spectral order on an array of UV detectors (24). Usually the first order spectrum is focused. The detector may be hand held.

17 Claims, 2 Drawing Sheets

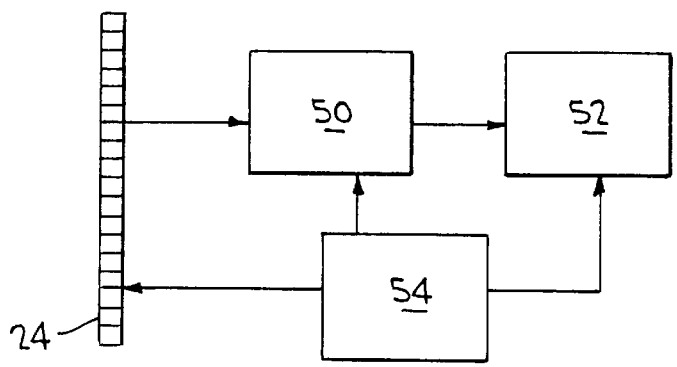
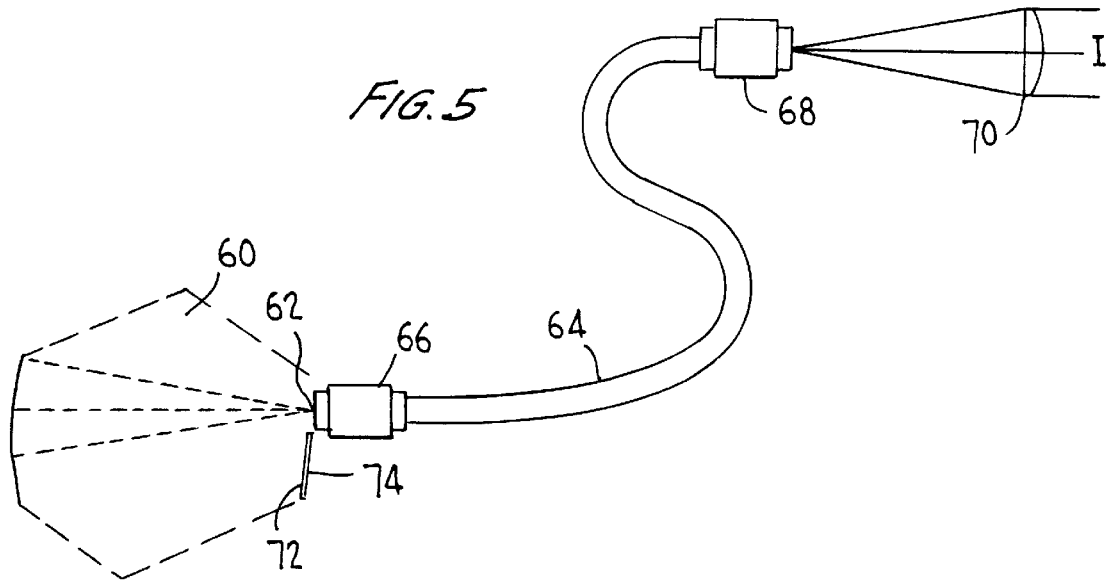

WAVEGUIDE FOR RADIATION DETECTION SYSTEM

This invention relates to radiation detectors, and relates more especially to a robust device which is small enough to be hand held.

One application for a robust yet accurate spectrographic hand-held device is in the measurement of ultraviolet radiation from the sun. There are currently concerns in many countries about the effect on living organisms, and especially on human health, of UV radiation from the sun. Currently available detectors however are either insufficiently accurate or are too large and heavy to be made widely available, e.g. for use on an individual basis as a personal portable device.

A known arrangement for providing a robust radiation detector is to provide all, or substantially all, of the components attached to a radiation-transparent body, the radiation path within the detector lying substantially within the body.

Such an arrangement is disclosed in U.S. Pat. No. 5,159,404, Carl-Zeiss-Stiftung, in which a diode-array spectrometer comprises a biconvex lens having a concave grating mounted on one convex surface, and a diode array spaced a small distance from the other convex surface. The device relies on the small air gap to allow tilting of the diode array to correct for tolerance variations of the carrier body. The device uses a curved diffraction grating which is not easy to manufacture, or to apply to the convex surface.

Another arrangement is described in PCT patent application, publication number: WO 92/11517, The Boeing Company, in which a demultiplexor/detector for a wavelength division multiplexing system comprises a planar waveguide having a variable line-spacing diffraction grating formed on a curved edge and a planar detector array attached to a straight edge. Such a device is robust in that there is no air gap, but is complex to manufacture.

Various configurations for demultiplexer units and a convex mirror are disclosed in the Journal of Lightwave Technology vol. LT-2, no.5, October 1984, New York US pages 731–734; Y. Fujii et al. 'Optical Demultiplexer Utilizing an Ebert Mounting Silicon Grating'. These units include an input fibre, a mirror, a flat diffraction grating, and an output fibre. The radiation entering the demultiplexer from the input fibre reflects off the mirror, onto the diffraction grating, then back onto the mirror and then onto the output fibre. The configurations shown all suffer to a greater or lesser degree from reflection loss reduction of the radiation and aberration.

It is an object of the invention to provide a radiation detector which is relatively simple to manufacture, and which provides both spectral and intensity measurement of a light source.

According to the invention, a radiation detection system comprising a radiation-transparent wave guide (10) having on one face entrance aperture means (18) to receive radiation, a first planar face (23) having associated radiation detector means (24), a curved reflective face (20, 22) positioned to receive radiation (36) from the entrance aperture means (18), and a second planar face (26) positioned to receive radiation (38) from the curved reflective face (20, 22) and having a planar diffraction grating (28) associated therewith, the arrangement being such that the curved reflective face (20, 22) and the planar diffraction grating (28) focus radiation (36, 38) diverging from the entrance aperture means (18) characterised in that the radiation detector means (24) is mounted on a different face from diffraction grating (28), radiation (36, 38) is diffracted by the diffraction grating (28) directly onto radiation detection means (24), and that a required spectral band and spectral order is focused on the radiation detector means (24).

Preferably the curved reflective face directs radiation onto the planar diffraction grating as a converging beam.

Preferably the central ray of the converging beam is incident on the planar diffraction grating at a small angle to the normal to the grating.

Preferably a first order spectrum is focussed onto the radiation detector means, and preferably this spectrum lies on the opposite side of the normal to the grating to the central ray of the incident convergent beam.

Optionally the curved reflective face has wavelength dependent reflectively such that radiation in the required spectral band is reflected towards the planar face and radiation at other wavelengths is transmitted out of the waveguide. Such reflective properties may be provided by use of a dielectric coating.

Alternatively, there is provided filter means external to the entrance aperture means which transmits substantially only radiation in the required spectral band.

Optionally the radiation detection system is ultra-violet sensitive and comprises a plurality of ultra-violet sensitive detectors, and optionally the first order spectrum is focused on the plurality of detectors.

The entrance aperture means may be a slit in an opaque coating on an input face of the waveguide or a light pipe may be provided.

Optionally, selected outer surfaces of the waveguide may be covered with a radiation-attenuating layer, such as a neutral density filter material, to reduce unwanted internal reflections.

Preferably the waveguide is planar in form having upper and lower faces which internally reflect radiation in the required spectral band, so that efficiency is improved and no radiation in that band incident through the entrance aperture means is lost. Optionally the upper and lower faces carry reflective coatings, or have a modified refractive index to enhance total internal reflection.

In use at least one radiation detector or detector array optically bonded to the planar detector face is connected to circuit means and display means to provide a suitable display relating to the intensity of the radiation incident on the entrance aperture means. The optical bonding minimises reflections at the interface of the detector arrayand the detector face.

Preferably the waveguide comprises a silica body, and optionally the waveguide is prepared by the steps of:
  machining a silica rod so as to have a curved reflecting face, and planar detector, diffraction and input faces;
  grinding and polishing the curved reflecting face, the diffraction face, the input face and the detector face;
  applying a radiation-opaque material to the input face so as to define an entrance aperture;
  applying to the curved reflecting face a coating which is reflective to radiation in the required spectral band;
  applying a diffraction grating to the diffraction face;
  and slicing the ingot to form a plurality of waveguides.

When a radiation-attenuating layer is applied, it is attached to the appropriate surfaces before slicing.

When a dielectric reflective filter is present on the curved reflective face, it may be applied as an additional step in the preparation process.

Optionally, the upper and lower faces of the slices are either coated or otherwise modified to enhance internal reflection of radiation in the required spectral band of wavelengths.

The plurality of detectors may be applied to the planar detector face after slicing.

The invention will now be described by way of example with reference to the accompanying drawings in which:

FIG. 4 illustrates schematically the electronic components of a UV detection system; and FIG. 5 illustrates an alternative optical arrangement for light collection.

Figure 1:
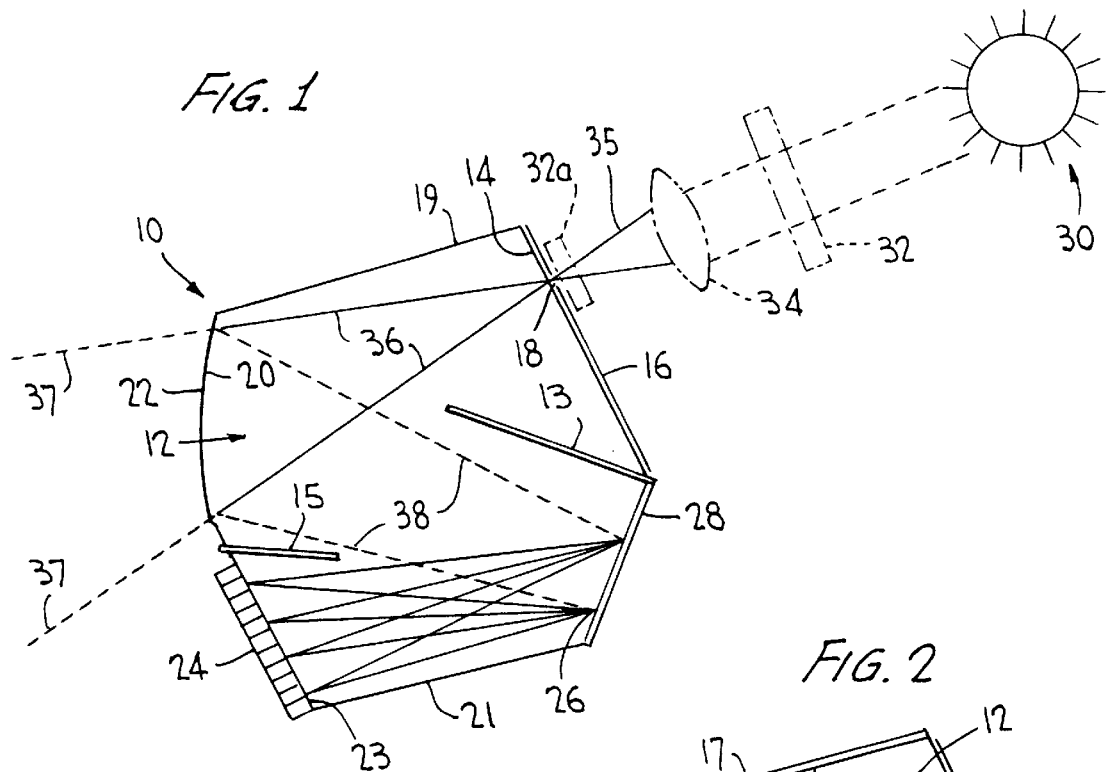
FIG. 1 illustrates the radiation path in a waveguide of a radiation detection system according to the invention.

FIG. 1 shows in plan a UV waveguide 10 comprising a thin slice of silica 12 having a planar input face 14 covered with an opaque film 16 of a metal such as aluminium which defines a slit 18.

Opposite the input face 14 is a curved face 20 covered with a layer 22 which is optionally reflective to UV radiation and transmissive to other wavelengths. Usually the layer will be a dielectric coating.

Next to the curved face 20 is a planar detector face 23 to which is optically bonded a planar array of detectors 24. Next to the input face 14 is a planar diffraction face 26 having a diffraction grating 28 attached to it.

External to the waveguide 10 there is shown a source 30, illustrated schematically and indicating the sun; an optional prefilter 32; an optional dielectric filter 32a; and a light-collection system 34.

In operation parallel light from the sun 30 falls on the light-collection system 34 which focuses radiation on to slit 18, and a divergent beam of radiation 36 passes within the waveguide 10 to the reflecting surface 20, 22 and is reflected to diffraction grating 28, which disperses it to the detector array 24.

If the optional prefilter 32 is present, it filters out non-UV radiation. If the optional dielectric filter 32a is present, it filters out any non-UV radiation. If unfiltered radiation is incident on the layer 22 and that layer is reflective to UV radiation, such radiation is reflected as a beam 38 to the diffraction face 26 while radiation at other wavelengths is transmitted as a beam 37. Usually at least one UV-selection stage will be provided, preferably the reflective filter layer 22.

To avoid the effects of scattering of radiation within the waveguide 10, optional baffles 13, 15 are provided; the baffles may be in the form of saw cuts in the waveguide body.

For a solar UV detector, sensitivity is required to UVB between 280 and 315 nanometers, and to UVA between 315 and 400 nanometers. For the first order spectrum to fall on the detector array 24, and using a grating having 1200 lines per millimeter, the distance from the grating 28 to the detector array 24 is typically 25 millimeters for typically 5 nanometers resolution. For the dispersion from the grating the relevant equation is:

$$d(\sin \phi + \sin \theta) = mx$$

where $\phi$=angle of incident light on the grating $\theta$=angle of dispersed light from the grating x=wavelength of incident light within the medium of the waveguide 10 d=line spacing of grating m=order of spectrum

A convenient detector array has a minimum of 24 elements to give the required resolution of approximately 5 nanometers across the range 280 to 400 nanometers. Each detector will be illuminated by a narrow band of UV radiation resulting from the dispersion and focusing effect of the waveguide.

An advantage of a thin-slice waveguide as described is that, while light from the slit 18 diverges as shown in FIG. 1 and also orthogonally, the orthogonally-divergent light is reflected back, by total internal reflection, or assisted by reflective coatings on the upper and lower faces of the waveguide; this improves overall efficiency of the detection system.

Figure 2:
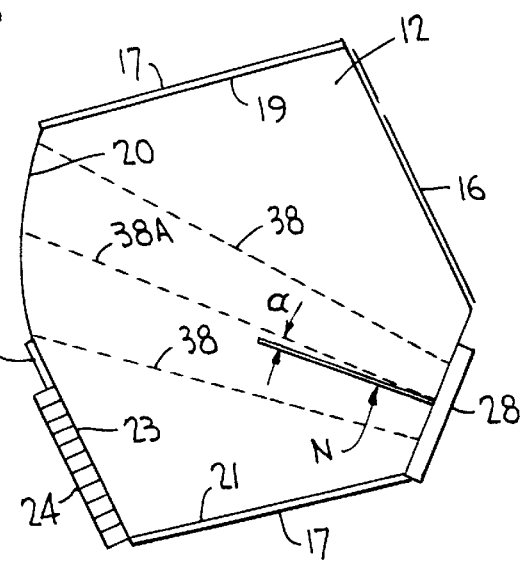
FIG. 2 is a simplified optical diagram.

FIG. 2 is a simplified optical diagram showing that the convergent beam 38 incident on the planar grating 28 has a central ray 38A which is incident on the grating 28 at a small angle $\alpha$ to the normal N to the grating. For any given configuration, there is an optimum value of $\alpha$, which is of the order of a few degrees, eg 5°.

The spectrum focussed on the detector array 24 is the first order spectrum on the opposite side of the normal N to the central ray 38A; it will be referred to as the "south side" spectrum. It is a feature of tha invention that the south side 1st order spectrum has been found to have a better, sharper, focus than the 1st order "north side" spectrum, ie the spectrum on the same side of the normal N as the central ray 38A.

Both the north and the south side 1st order spectra will have a curved locus of their foci, but for the wavelength range of interest, ie 200–400 nanometers, the south side spectrum provides excellent results.

Conveniently, FIG. 2 also shows a feature omitted from FIG. 1 for clarity; to minimise unwanted internal reflections within the slice of silica 12, a layer of neutral density NG filter material, or "black glass", is applied to several external surfaces and is indicated by shading 17. The black glass is applied to the face 19 between the input face 14 and the curved face 20, and to the face 21 between the detector face 24 and the grating 28.

The black glass is chosen to have a refractive index which is closely similar to fused silica, and allows light to enter from the silica slice 12, but any return beam from the black glass is attenuated by a factor of about 10,000:1.

Figure 3:
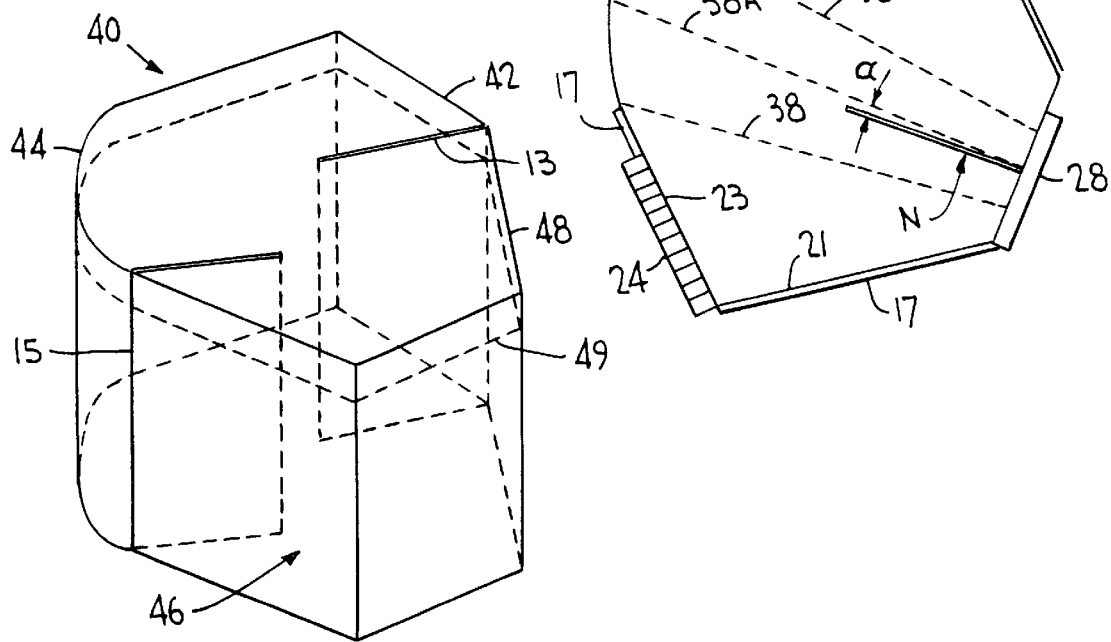
FIG. 3 illustrates the manufacturing method of a waveguide.

FIG. 3 illustrates the method of manufacture of waveguide 10. An ingot of fused silica is machined to have the shape shown in the Figure at reference 40 as a shaped rod about 50 millimeters in diameter.

The rod has a planar input face 42, an opposite curved face 44, adjacent planar detector face 46, and a planar grating face 48. After machining to the approximate cross section along the full length of the ingot, the grating face 48 is ground and polished to a plane; the curved face 44, the detector face 46 and the input face 42 are also ground and polished.

The optional sawcuts forming baffles 13, 15 are also made, if required.

The black glass, reference 17 in FIG. 2, is attached to the appropriate faces, by cutting sheets to size and gluing them into position. A grating, which may be a holographic grating, is formed on the grating face 48 by known techniques, or alternatively is attached to the grating face.

The rod 40 is then cut into slices as illustrated by dotted line 49, each a few millimeters thick, retaining the coating on the prepared faces. The plurality of detectors is optically bonded to the detector face. The upper and lower faces of each slice are polished, and optionally, aluminised. Alternatively, the upper and lower faces are coated with wavelength dependent coating to allow non-UV radiation to escape from the waveguide.

Typically the rod 40 is of Spectrosil or Suprasil grade fused silica for a solar UV detection system.

FIG. 4 illustrates schematically the detector array 24 connected to an amplification and measurement circuit 50 which in turn is connected to a display unit 52. The detector array 24, circuit 50 and display unit 52 are all connected to a power supply 54, which may be a solar cell.

In operation, the detector array amplification and measurement circuit combination is calibrated after manufacture and assembly of the device, and the display unit is arranged to give a suitable display of incident UV radiation.

This may if required indicate UVB and UVA separately; UVA is the range 315 to 400 nanometers and UVB is the range 280 to 315 nanometers. Since the different wavelengths are focussed on different individual detectors in the array 24, the outputs can be grouped and summed by the circuit 50 to provide separate outputs and displays relating to UVA and UVB.

FIG. 5 illustrates an alternative arrangement of a radiation detector according to the invention, in which a silica body 60 has an entrance slit 62. Incident light I is supplied through a UV transparent, flexible lightpipe 64. The output end 66 of the light pipe is placed closely adjacent the slit 64, and the input end 68 receives incident light I through a spherical lens 70. The flexibility of the light pipe 64 allows the radiation detector to be used more conveniently, eg directed more easily towards a light source of interest.

Comparison of FIGS. 1 and 5 will show that the silica bodies 12 and 60 are of slightly different shape. In FIG. 5, the input slit 62 and the planar grating are on the same plane face 72. which may be more convenient for manufacture.

A radiation detection system based on the waveguide format of the invention can be made by modern manufacturing techniques to be robust and lightweight; it can also be simple to calibrate, and its performance not subject to degradation with time.

We claim:

1. A radiation detection system comprising a radiation-transparent wave guide (10) having on one face entrance aperture means (18) to receive radiation, a first planar face (23) having associated radiation detector means (24), a curved reflective face (20, 22) positioned to receive radiation (36) from the entrance aperture means (18), and a second planar face (26) positioned to receive radiation (38) from the curved reflective face (20, 22) and having a planar diffraction grating (28) associated therewith, the arrangement being such that the curved reflective face (20, 22) and the planar diffraction grating (28) focus radiation (36, 38) diverging from the entrance aperture means (18) characterised in that the radiation detector means (24) is mounted on a different face from diffraction grating (28), radiation (36, 38) is diffracted by the diffraction grating (28) directly onto radiation detection means (24), and a required spectral band and spectral order is focused on the radiation detector means (24).

2. A radiation detection system according to claim 1 characterised in that the curved reflective face (20, 22) is configured so as to direct radiation onto the planar diffraction grating (28) as a converging beam.

3. A radiation detection system according to claim 2 characterised in that the aperture (18), curved reflective face (20, 22), and the planar diffraction grating (28) are configured relative to each other so that a central ray (38A) of the converging beam (38) is incident on the planar diffraction grating (28) at a small angle ($\alpha$) to the normal (N) to the grating.

4. A radiation detection system according to claim 1 characterised in that the aperture (18), curved reflective face (20, 22), and the planar diffraction grating (28) are configured relative to each other so that a first order spectrum is focussed on to the radiation detector means (24).

5. A radiation detection system according to claim 4 characterised in that said first order spectrum lies on the opposite side of the normal (N) to the grating (28) to the central ray (38A) of the incident convergent beam (38).

6. A radiation detection system according to claim 1 characterised by comprising a plurality of ultraviolet sensitive detectors (24).

7. A radiation detection system according to claim 1 characterised in that the radiation detector means (24) is connected to circuit means (50) and display means (52) to provide a display relating to the intensity of the radiation incident on the entrance aperture means (18).

8. A radiation detection system according to claim 1 characterised in that the wave guide (10) comprises a silica body (12).

9. A method of providing a radiation detection system according to claim 8 characterised in that the silica wave guide (12) is prepared by the steps of:

machining a silica rod so as to have a curved reflecting face (20), and planar detector, diffraction and input faces (23, 26, 14);

grinding and polishing the curved reflecting face (20), the diffraction face (26), the input face (14) and the detector face (23);

applying a radiation-opaque material (16) to the input face (14) so as to define an entrance aperture (18);

applying to the curved reflecting face (20) a coating (26) which is reflective to radiation in the required spectral band;

applying a diffraction grating (28) to the diffraction face (26);

and slicing the rod to form a plurality of wave guides (10).

10. A radiation detection system according to claim 1 wherein the curved reflective face has wavelength dependent reflectivity such that radiation in the required spectral band is reflected towards the second planar face and radiation at other wavelengths is transmitted out of the waveguide.

11. A radiation detection system according to claim 2 wherein the curved reflective face has wavelength dependent reflectivity such that radiation in the required spectral band is reflected towards the second planar face and radiation at other wavelengths is transmitted out of the waveguide.

12. A radiation detection system according to claim 3 wherein the curved reflective face has wavelength dependent reflectivity such that radiation in the required spectral band is reflected towards the second planar face and radiation at other wavelengths is transmitted out of the waveguide.

13. A radiation detection system according to claim 4 wherein the curved reflective face has wavelength dependent reflectivity such that radiation in the required spectral band is reflected towards the second planar face and radiation at other wavelengths is transmitted out of the waveguide.

14. A radiation detection system according to claim 5 wherein the curved reflective face has wavelength dependent reflectivity such that radiation in the required spectral band is reflected towards the second planar face and radiation at other wavelengths is transmitted out of the waveguide.

15. A radiation detection system according to claim 6 wherein the curved reflective face has wavelength dependent reflectivity such that radiation in the required spectral band is reflected towards the second planar face and radiation at other wavelengths is transmitted out of the waveguide.

16. A radiation detection system according to claim 7 wherein the curved reflective face has wavelength dependent reflectivity such that radiation in the required spectral band is reflected towards the second planar face and radiation at other wavelengths is transmitted out of the waveguide.

17. A radiation detection system according to claim 8 wherein the curved reflective face has wavelength dependent reflectivity such that radiation in the required spectral band is reflected towards the second planar face and radiation at other wavelengths is transmitted out of the waveguide.

* * * * *

UNITED STATES PATENT AND TRADEMARK OFFICE
CERTIFICATE OF CORRECTION

PATENT NO. : 5,812,262
DATED : September 22, 1998
INVENTOR(S) : Andrew Ridyard et al It is certified that error appears in the above-indentified patent and that said Letters Patent is hereby corrected as shown below:

On the title page,

[86] the § 371 and 102(e) dates should read -- March 10, 1997 versus April 10, 1997.

Signed and Sealed this

Twentieth Day of July, 1999

Attest:

Q. TODD DICKINSON

*Attesting Officer*   *Acting Commissioner of Patents and Trademarks*